US007260617B2

(12) United States Patent
Bazinet et al.

(10) Patent No.: US 7,260,617 B2
(45) Date of Patent: Aug. 21, 2007

(54) METHOD, SYSTEM, AND ARTICLE OF MANUFACTURE FOR IMPLEMENTING SECURITY FEATURES AT A PORTAL SERVER

(75) Inventors: Allan Arthur Loring Bazinet, Colchester, VT (US); Phyllis Leigh Ho, San Francisco, CA (US); Sekhar Meka, San Jose, CA (US); Mandy L. Wang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/090,556

(22) Filed: Mar. 4, 2002

(65) Prior Publication Data

US 2003/0167298 A1 Sep. 4, 2003

(51) Int. Cl.
*G06F 15/16* (2006.01)
(52) U.S. Cl. .................. 709/219; 709/217; 709/225
(58) Field of Classification Search ........ 709/217–219, 709/223, 225, 227–229, 249; 713/200–202
See application file for complete search history.

(56) References Cited

U.S. PATENT DOCUMENTS

| 5,265,221 | A |  | 11/1993 | Miller |  |
|---|---|---|---|---|---|
| 5,850,516 | A |  | 12/1998 | Schneier |  |
| 5,930,824 | A |  | 7/1999 | Anglin et al. |  |
| 6,199,077 | B1 | * | 3/2001 | Inala et al. | 715/501.1 |
| 6,327,628 | B1 | * | 12/2001 | Anuff et al. | 719/311 |
| 6,460,084 | B1 | * | 10/2002 | Van Horne et al. | 709/227 |
| 6,643,661 | B2 | * | 11/2003 | Polizzi et al. | 707/100 |
| 6,668,353 | B1 | * | 12/2003 | Yurkovic | 715/501.1 |

(Continued)

OTHER PUBLICATIONS

J.Diaz, et al., "An Implementation of a Secure Java2-Based Mobile Agent System", Proc. 2$^{nd}$ International Conference on the Practical Application of Java, Blackpool, pp. 125-142, 2000.

(Continued)

*Primary Examiner*—William C Vaughn, Jr.
*Assistant Examiner*—Joseph Maniwang
(74) *Attorney, Agent, or Firm*—Rabindranath Dutta; Konrad Raynes & Victor LLP (57) ABSTRACT

Provided is a method, system, and an article of manufacture for implementing security at a portal server. The portal server provides a client with access to backend applications, where the backend applications are stored at backend servers separate from the portal server. Associated with each backend application are privileges and other security features. The privileges and the security features are stored at a database in the portal server. The portal server receives a request from a client and constructs a list of allowable interactions for a plurality of the backend applications, by consulting the database. The portal server sends a page containing the list of allowable interactions to the client. The client selects an interaction and requests the portal server for a result of the interaction. The portal server requests a backend server to provide the result, and returns the result to the client, along with a set of new allowable interactions for the client to select.

47 Claims, 5 Drawing Sheets

U.S. PATENT DOCUMENTS

| | | | | |
|---|---|---|---|---|
| 6,725,425 B1* | 4/2004 | Rajan et al. | ............... | 715/513 |
| 6,813,715 B2* | 11/2004 | Yi | ............... | 713/201 |
| 6,957,199 B1* | 10/2005 | Fisher | ............... | 705/78 |
| 2001/0056495 A1* | 12/2001 | Iida | ............... | 709/229 |
| 2002/0023122 A1* | 2/2002 | Polizzi et al. | ............... | 709/202 |
| 2002/0049655 A1* | 4/2002 | Bennett et al. | ............... | 705/35 |
| 2002/0069286 A1* | 6/2002 | Yu | ............... | 709/229 |
| 2002/0156905 A1* | 10/2002 | Weissman | ............... | 709/229 |
| 2002/0161831 A1* | 10/2002 | Nakaoka et al. | ............... | 709/203 |

OTHER PUBLICATIONS

B. Hashii, et al., "Supporting Reconfigurable Security Policies for Mobile Programs", Computer Networks, vol. 33, No. 1-6, Jun. 2000, pp. 77-93.

Netegrity, "Netegrity SiteMinder Security Bridge®", [online], 2002, pp. 1-2. [Retrieved on Mar. 1, 2002]. Retrieved from the Internet at <URL: http:/www.netegrity.com/products/index.cfm?leveltwo=SecurityBridge>.

* cited by examiner

METHOD, SYSTEM, AND ARTICLE OF MANUFACTURE FOR IMPLEMENTING SECURITY FEATURES AT A PORTAL SERVER

BACKGROUND OF THE INVENTION

1. Field of the Invention

The present invention relates to a method, system, program, and article of manufacture for implementing security features at a portal server.

2. Description of the Related Art

A portal site is a World Wide Web site or service that offers a broad array of resources and services, such as e-mail, forums, search engines, and on-line shopping malls. A portal server functions as a Web server that hosts the portal site. Prior art portal sites usually categorize content and provide a hyperlink for each category. The hyperlinks may lead to other Internet Web sites outside the portal server. Users access the portal server via a Web browser and click on a hyperlink to read content. Examples of such portal servers are those run by Yahoo!, Microsoft Network, and America Online**.

**Yahoo! is a trademark of Yahoo!, Inc.; Microsoft and Active Server Pages are trademarks of Microsoft Corporation; America Online is a trademark of America Online, Inc.; Netegrity is a trademark of Netegrity, Inc.; Novell is a trademark of Novell, Inc.; Tivoli is a trademark of Tivoli Systems, Inc.; Java and Java server pages are trademarks of Sun Microsystems, Inc.

Some portal servers provide access to a plurality of software applications, where the software applications are stored in servers that are external to the portal server. Such software applications are called backend applications, and the servers in which the backend applications are stored are called backend systems. A user directs a Web browser to connect to the portal server, and subsequently accesses the backend applications via the portal server. The portal servers provide a single point of interaction to the backend applications personalized to the user's needs and responsibilities. A single unified interface on a portal server typically provides the single point of interaction to a user.

Portal servers can transform the manner in which users access, manage, and share essential data and applications. Portal servers may organize business applications, syndicated content, e-mail messages, and any other relevant information into a workspace that can be customized to a user's specifications. An example of such a portal server is the Netegrity** Interaction Server.

When a portal server provides access to backend applications users do not have to store bookmarks at a Web browser for each of the individual backend applications. For example, corporate users may use a Web browser and access corporate-wide applications, such as Web-based electronic mail, instant messaging system, corporate accounting information etc., via a corporate portal server.

Users may have to authenticate with a portal server by typing in a username and a password, using a smartcard or via other means before the users can access the backend applications. Some prior art portal servers also use the authentication information of the user to display personalized information tailored for the user. Hence, prior art portal servers provide a rudimentary security mechanism for authentication with the portal server before allowing access to the backend applications.

However, even in prior art portal servers that require authentication from a user, a backend application may require additional authentications before users can access the backend application. In addition, there are security issues beyond authentication. For example, even within the same backend application different users may have different types of privileges. For example, some users may be able to update corporate accounting information whereas other users may be able to read but not update the corporate accounting information.

There are existing single sign-on products, such as the Novell Single Sign-on or the Tivoli Global Sign-on that enable client applications to authenticate with a plurality of servers via a single login. However, such single sign-on applications generally do not enforce a high level of security beyond authentication and furthermore are directory-based software solutions. In addition, such directory-based single sign-on products do not typically function on a portal server.

Hence, there is a need in the art to provide a system, method and article of manufacture for a portal server that securely allows access to a plurality of backend applications stored on backend servers.

SUMMARY OF THE PREFERRED EMBODIMENTS

Provided are a method, system and article of manufacture for implementing security features at a portal server. The portal server receives a first request from a client. In response to receiving the first request, the portal server authenticates the client. The portal server consults a database to determine access privileges of the authenticated client for interactions with a plurality of applications, wherein the applications are located at backend servers. Then the portal server generates code containing selectable interactions with the applications, wherein any authentication for the selectable interactions can be performed within the portal server. Subsequently, the portal server sends the code to the client.

In one implementation, in response to sending the code to the client, the portal server receives a second request from the client, wherein the second request contains a selection of at least one of the selectable interactions. The portal server determines from the selection a set of backend servers to process the request. The portal server forwards the request to the set of backend servers. The portal server receives results corresponding to the request from applications executing on the backend servers and sends the results to the client. In one implementation, along with the results, further selectable operations are sent to the client.

Additional implementations describe a method, system and article of manufacture for securely distributing a backend application from a backend system. The backend system creates data structures corresponding to interactions with the backend application. The backend system associates privileges for each of the data structures, wherein the privileges can be checked at a portal application separately hosted from the backend application. The backend application receives a request from the portal application for reading the data structures and sends the data structures to the portal application. In one implementation, the backend application receives a request for an interaction with the backend application from the portal application. The backend application processes the request without checking for the privileges and sends the results of processing the request to the portal server.

Additional implementations describe a method, system, and article of manufacture for accessing a group of applications at a client computer. The client computer authenticates with a portal server. Subsequently, the client computer receives from the portal server a list of interactions that can be performed with the applications, wherein the applications are stored at backend servers that are different from the portal server. The client computer selects an interaction and receives results based on the selection of the interaction without authenticating with the backend servers. In one implementation, the client receives a set of further interactions selectable by the client.

The implementations enable a client to access a plurality of backend application via a single portal server. The portal server enforces security on behalf of the plurality of backend applications.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
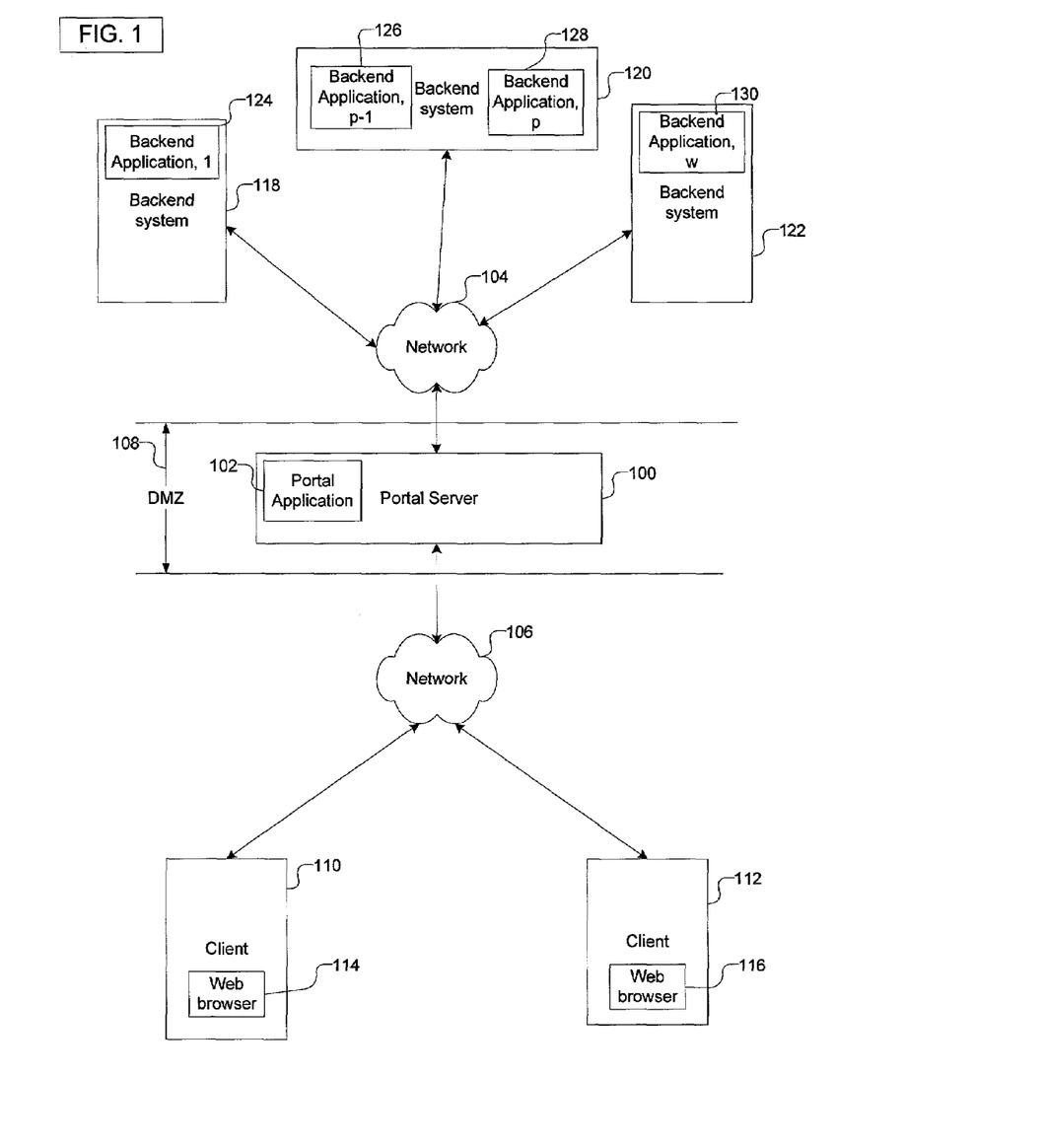
FIG. 1 illustrates a block diagram of a computing environment including certain implementations of the invention.

In the following description, reference is made to the accompanying drawings which form a part hereof and which illustrate several implementations. It is understood that other implementations may be utilized and structural and operational changes may be made without departing from the scope of the present implementations FIG. 1 illustrates a block diagram of a computing environment including certain implementations of the invention. A portal server 100 contains a portal application 102 and connects to two networks 104 and 106. The portal server 100 may be any computational device such as a personal computer, a workstation, a server-class computer, a mainframe, a laptop, hand-held, palm-top or telephony device. Network 104 and 106 may be a local area network, an Intranet, the Internet or any other type of network. In one implementation network 104 is a local area network and network 106 is the Internet.

Portal server 100 is located within a demilitarized zone (DMZ) 108. The DMZ 108 allows the portal server 100 to host Internet services but at the same time prevents unauthorized access to the network 104 via Internet connections to the portal server 100. Computational devices that connect to network 106 cannot connect to computational devices that connect to network 104 except via the portal server 100. The DMZ 108 insulates network 104 and 106 from each other and thereby provides some network security. The DMZ 108 is created by insulating the portal server 100 via firewalls, proxy servers etc. from networks 104, 106 in a manner known in the art.

The portal application 102 is a Web based application. Clients 110 and 112 can connect to the portal application 102 on the portal server 100 through the network 106 via the hypertext transfer protocol (HTTP) from Web browsers 114, 116. For example, Web browser 114 may send a HTTP request for the portal application 102 from client 110 to portal server 100 across network 106. In response to the HTTP request from the client 110, the portal application 102 sends a Web page to the client 110. The Web browser 114 on the client 110 displays the Web page. The portal application may be implemented in any programming language such as Java, C++ etc. The Web pages sent by the portal server 100 to the clients 110 and 112 may include code in Active server pages, Java server pages, Hypertext Markup languages (HTML), Extensible Markup Language (XML) etc. The Web browsers 114, 116 render the code on the screen of the clients 110, 112.

Backend systems 118, 120, 122 connect to portal server 100 via the network 104. Each of the backend systems 118, 120, 122 contains one or more backend application [1 . . . w] 124, 126, 128, 130. In FIG. 1, backend system 118, contains one backend application 124; backend system 120 contains two backend applications 126, 128; and backend system 122 contains one backend application 130. The backend systems 118, 120, 122 may be any computational device such as a personal computer, a workstation, a server-class computer, a mainframe, a laptop, hand-held, palm-top or telephony device. The backend applications 124, 126, 128, 130 may be any server-based software application such as Web-based electronic mail, an Instant messenger server, a server-based spreadsheet, a database server etc.

The portal application 102 provides a single point of access to the [1 . . . w] backend applications 124, 126, 128, 130. Clients 10, 112 access the [1 . . . w] backend applications 124, 126, 128, 130 by accessing the portal application 102.

Figure 2:
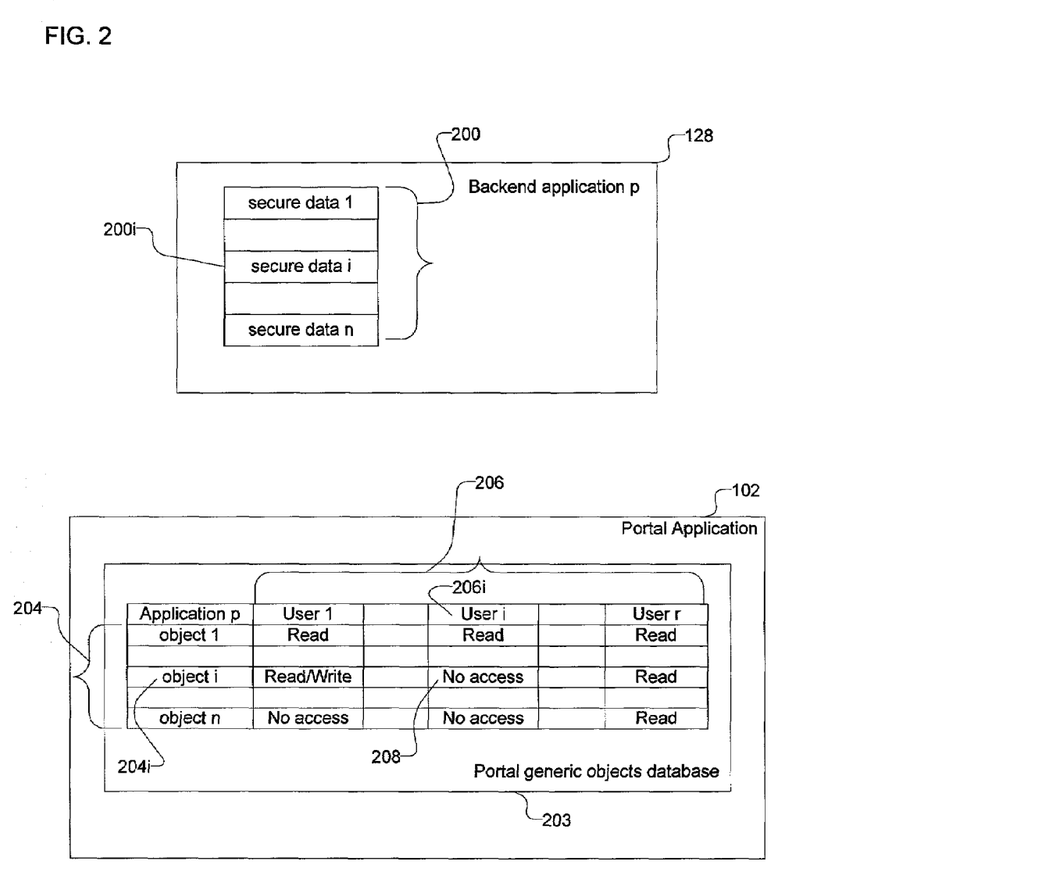
FIG. 2 illustrates the data structures associated with a generic objects database in a portal server in accordance with certain described implementations of the invention.

FIG. 2 illustrates the data structures associated with a generic objects database in a portal server in accordance with certain implementations of the invention. The backend application p 128 [where p varies from 1 . . . n] has n secure data objects [1 . . . n] 200, with the $i^{th}$ secure data object denoted by reference numeral 200$i$. Each of the n secure data objects 200 may have different security attributes. For example, a secure data object i 200$i$ may be readable and writable by one user but inaccessible to another user. Each of the secure data objects 200 may correspond to different interactions with the backend application p 128, different resources of the backend applications p 128, different operations with the backend application p 128, or different types of functions within the backend applications 128.

Associated with the portal application 102 is a portal generic objects database 203. For every backend application p 128, the portal generic objects database 203 contains a set of generic objects and associated security attributes for each potential user. In FIG. 2, for backend application p 128, the portal generic objects database 203 contains n elements, such as n generic objects [1 . . . n] 204, where the generic object i 204$i$ corresponds to secure data object i 200$i$. The generic object i 204$i$ stores at least those parts of the secure data object i 200$i$ that are necessary for accessing and manipulating the secure data object i 200$i$. The portal generic objects database 203, stores for each generic object i 204$i$ the security attributes for r users [1 . . . r] 206, with the $i^{th}$ user denoted by reference numeral 206$i$. For example, in FIG. 2 for backend application p 128, secure data object i 200$i$, represented by generic object i 204$i$ is not accessible (shown in table entry marked with reference numeral 208) to user i 206$i$.

FIG. 2 has shown only certain security attributes corresponding to the secure data objects 200 in the portal generic objects database 203. Furthermore, the portal generic objects database 203 has been represented as a table. Alternative implementations where the portal generic objects database 203 is represented in forms other than a table, such as in a relational database format, in extensible markup language (XML), a class etc., and where the security attributes are different from those shown in FIG. 2 are possible.

Figure 3:
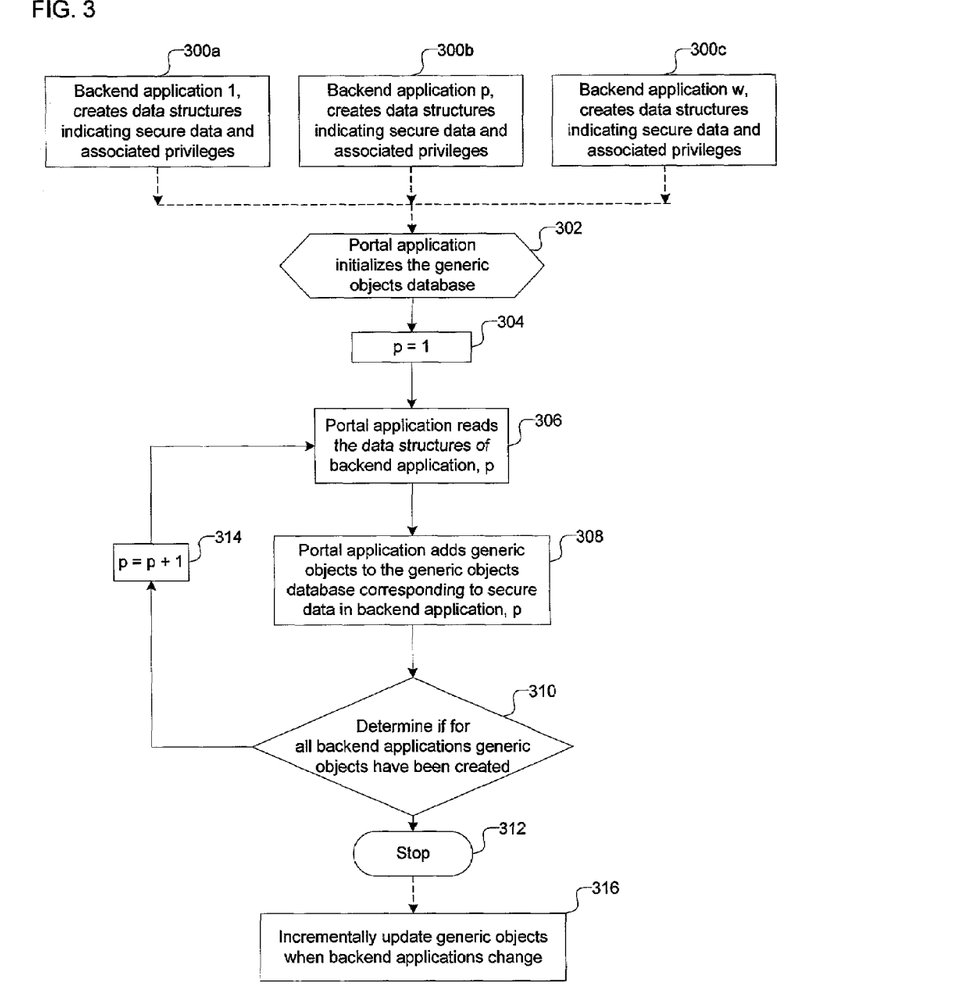
FIG. 3 illustrates logic to populate a generic objects database in a portal server in accordance with certain described implementations of the invention.

FIG. 3 illustrates logic to populate a portal generic objects database 203 in a portal server 100 in accordance with certain implementations of the invention. If there are w backend applications [1 . . . w] 124, 126, 128, 130, each of the backend applications [1 . . . w] 124, 126, 128, 130 initially create (in blocks 300a, 300b, 300c) generic objects 204 corresponding to the secure data objects 200 of each of the backend applications [1 . . . w] 124, 126, 128, 130. The secure data objects 200 contain the privileges and other security attributes related to each user of the corresponding secure data objects. In certain implementation, the secure data objects can also be modeled as business objects, where the business objects encapsulate security policies and practices of an enterprise.

Subsequent to the creation of the secure data objects 200 by the backend applications, the portal application 102 initializes (at block 302) the portal generic objects database 203. At block 304, the portal application 102 assigns the variable p to one. The portal application 102 reads (at block 306) the secure data objects 200 of backend application p 128. The portal application 102 adds (at block 308) generic objects 204 to the portal generic objects database 203 corresponding to the secure data objects 200 of backend application p 128. The portal application 102 and the backend application p 128 must have a prior arrangement such that the format of the generic objects 204 created by the backend application p 128 are interpretable by the portal application 102. Different backend applications [1 . . . w] 124, 126, 128, 130 may have different a priori arrangements with the portal application 102. In one implementation the secure data objects 200 may be in a standardized data representation format such as an extensible markup language (XML) format. Other data structure representations, such relational databases, classes may be also used to implement the secure data objects 200 in a manner known in the art.

Control passes to block 310, where the portal application 102 determines if generic objects 204 have been created for all backend applications [1 . . . w] 124, 126, 128, 130. If so, at block 312 the process comes to a stop. Otherwise, control proceeds to block 314 where the portal application 102 increments p, and repeats the logic of blocks 306 to 310 for the next backend application, i.e. backend application p. In an alternative implementation instead of the portal application 102 updating the generic objects database, the backend applications [1 . . . w] 124, 126, 128, 130 update the generic objects database.

Subsequent to executing the logic block 312, the backend applications [1 . . . w] 124, 126, 128, 131 may change, such as when a new version of a backend application [1 . . . w] 124, 126, 128, 130 is installed on a backend system 118, 120, 122. In such case, control proceeds to block 316 where the portal application 102 incrementally updates the generic objects database 203 to reflect the change in the backend application [1 . . . w] 124, 126, 128, 130.

Figure 4:
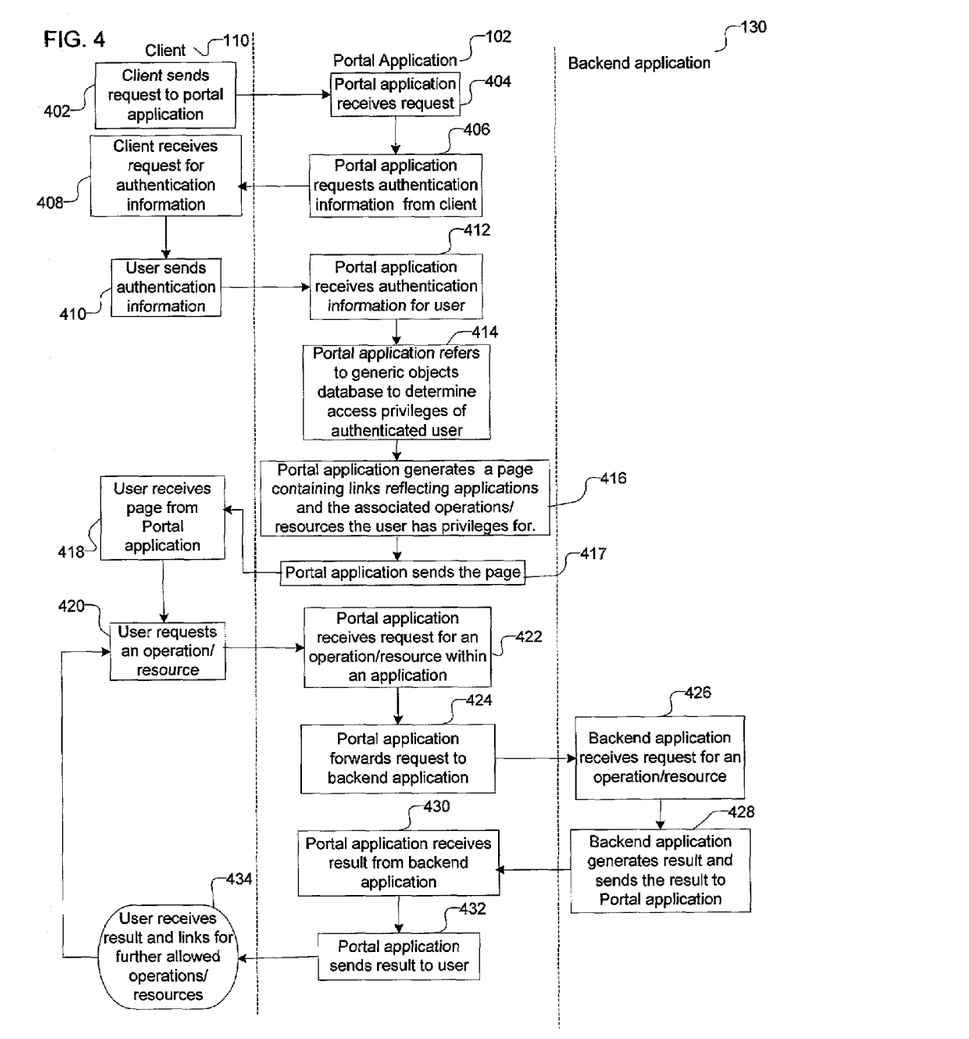
FIG. 4 illustrates logic to process the method for accessing a backend application from a browser in accordance with certain described implementations of the invention.

FIG. 4 illustrates logic implemented in the Web browser 114 on the client 110, the portal application 102 and the backend application 130 to access the backend application 130 from the Web browser 114 in accordance with certain implementations of the invention. The Web browser 114 uses the portal application 102 to access the backend application 130. In other implementations, the Web browser 114 may also access additional backend applications via the portal application 102. In further implementations, the portal application 102 may also allow other Web browsers on other clients to access the backend application 130, and other backend applications. Thus a plurality of clients may access a plurality of backend applications by the portal application 130.

At block 402, the Web browser 114 located on the client 110 sends a request to the portal application 102. The portal application 102 receives (at block 404) the request. The portal application 102 requests (at block 406) authentication information from the client 110. The client 110 receives (at block 408) the request for authentication. Control proceeds to block 410, where a user at the client 110 enters the authentication information and the client 110 sends the authentication information to the portal application 102. The authentication information may include a username and password combination, data on a smartcard etc. The portal application 102 receives (at block 412) the authentication information entered by the user from the client 110 and may establish a secure session with the client 110 in a manner known in the art, thereby avoiding repeated entry of authentication information by the user. In alternative implementations, a computer program may perform the functions of the user. At block 414, the portal application 102 refers to the generic objects database 203 to determine access privileges of authenticated user.

Control proceeds to block 416, where the portal application 102 generates a page to the client 110 containing entries corresponding to the backend applications [1 . . . w] 124, 126, 128, 130 that the authenticated user can access, based on the access privileges of the authenticated user. The page may also include interactions, such as the associated operations that the authenticated user can perform and the resources the authenticated user can access based on the access privileges of the authenticated user. The portal application sends (at block 417) the page to the client 110. Additional details of the page are described in FIG. 5.

Figure 5:
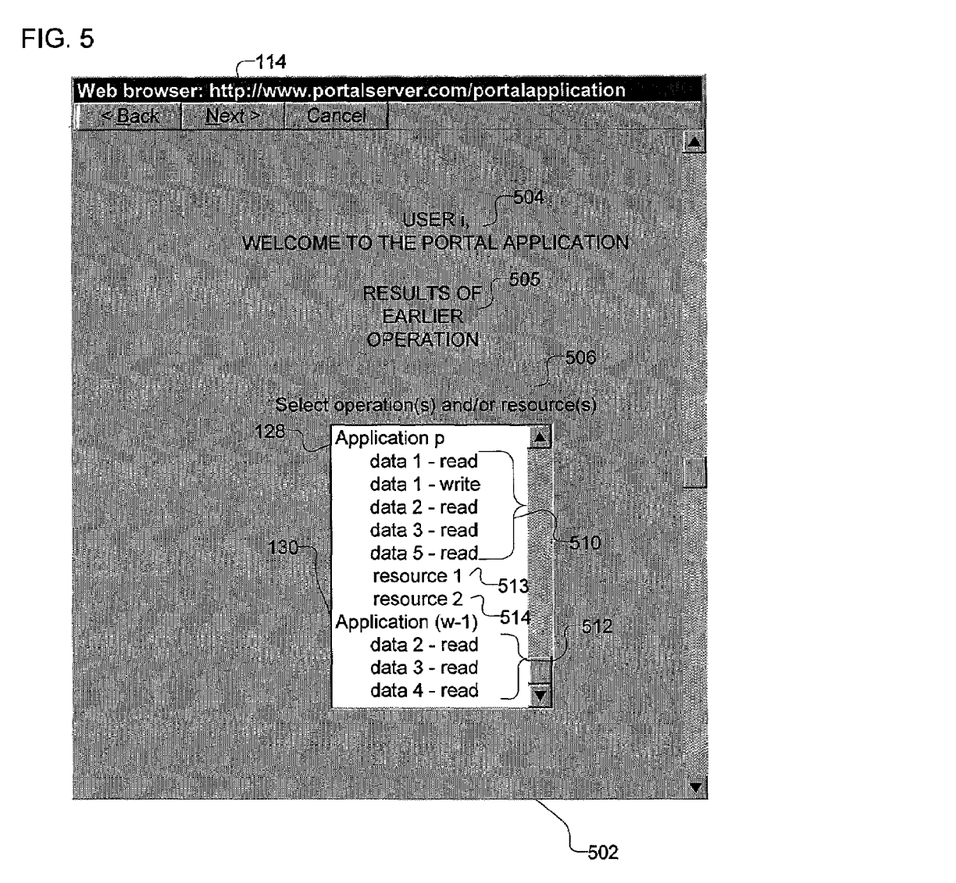
FIG. 5 illustrates a graphical user interface on a browser in accordance with certain described implementations of the invention.

FIG. 5 illustrates a graphical user interface on a Web browser in accordance with certain implementations of the invention. A Web browser 114 at client 110 receives code corresponding to a Web page 502 from portal application 102 and displays the page 502 at the client 110. The Web page 502 may contain a header text 504 stating "User i, welcome to the portal application" followed optionally by results of earlier operations 505 by User i, followed by instructions 506 requesting User i to "select operation(s) and/or resource(s)."

The Web browser 114 also displays on page 502 a list of backend applications 128, 130 along with operations 510, 512 that can be performed on each backend application 128, 130 and resources 513, 514 that can be selected on each backend application 128, 130. Resources 513, 514 could include any entity related to the backend applications 128, 130 such as objects, data structures, files etc. For example, in backend application p 128, User i may perform the operations 510, i.e. read and write on data 1 and read on data 2, 3, and 4. User i may also select resource 513. The page 502 corresponds to the page sent by the portal application 102 in blocks 417, 432 of the logic illustrated in FIG. 4. The graphical user interface illustrated in FIG. 5 may be displayed in a variety of other ways, including different selection mechanisms such as hyperlinks, radio buttons, check boxes etc. In addition in some implementations, the user i may be able to select a multiple number of operations, resources, or any other interaction with a backend application from the graphical user interface.

Returning back to the description of FIG. 4, the entries corresponding to the resources and operations the user may access on the page sent by the portal application 102 may include hyperlinks, items in a drop down list, selectable radio buttons associated with the entries or any other user interface controls. The page may include active code such as in Java, in addition to HTML code. For example, the portal server may send a page containing an entry, where the entry indicates that for a particular corporate financial backend program the authenticated user is entitled to read but not update the financial information contained within the financial backend program.

Control proceeds to block 418, where the authenticated user at client 110 receives the page from the portal application 102. The authenticated user selects one of the entries in the page the authenticated user has received and requests (at block 420) an operation or a resource within the corresponding backend application [1 . . . w] 124, 126, 128, 130. The portal application 102 receives (at block 422) the request for access to the operation or the resource from the authenticated user.

At block 424, the portal application 102 determines that the operation or resource is part of application p 128 and forwards the request to the backend application p 128. The backend application p 128 receives (at block 426) the request for the operation or resource within the backend application p 128. The backend applications 128 generates the result of the operation or the selection of the resource and sends (at block 428) the result to the portal application 102. The operations may include any operation that can be performed by a software application, such as a database query, a file transfer, an instant message interaction etc. Similarly, the resources can include any resource related to the backend applications 128. The backend applications 128 may secure the resource from another backend application or may perform the operations via interactions with another backend application.

The portal application 102 receives (at block 430) the result from the backend application p 128 and sends (at block 432) the result, including entries for further operations or resources to the authenticated user. The authenticated user receives (at block 434) the result and the entries for further operations and resources. The authenticated user may continue to select a further operation or resource on Web browser 114 in which case control proceeds to block 420 and the logic of blocks 422 to 434 is repeated. If at block 434 the authenticated user after receiving the result and the entries for further operations and resources does not select an operation or resource, the process may terminate at block 434. The process may also terminate if the user does not select an operation or resource within a predetermined amount of time via a session timeout in a manner known in the art.

The implementations enable a portal server to ensure security on behalf of backend applications. Unlike prior art access mechanisms for a backend application wherein a user on a client may have to a priori know the details pertaining to the backend application before accessing the application, the portal server allows the user to access backend applications residing on backend servers without any such a priori knowledge. The client has to perform authentications only with the portal server and does not have to repeatedly authenticate with each backend server. Hence, with the described implementations, the clients can access the backend applications faster, a request from a client can be mapped by the portal server to multiple backend applications, and incremental changes to backend applications can be accommodated by incremental changes to the portal application.

Additional Implementation Details

The described portal applications, backend applications and client applications may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium, hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The implementations can be adapted for any type of networked data delivery mechanisms, including client-server and peer-to-peer data delivery mechanisms. Also, in alternative implementations, some of the backend applications may be stored in the portal server. Although the implementations have been described with reference to a Web browser at a client, other display mechanisms besides a Web browser, e.g. a client window such as an X-window, can substitute or augment the Web browser.

The resources the backend applications make available to the users may comprise multimedia content, objects, files, attributes of objects, program elements, database objects, table entries, data structures etc. or any other types of resources known in the art. The operations may include any operations such as database queries, program execution, functions etc. or any other types of operations known in the art.

The preferred logic of FIGS. 3 and 4 described specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing security features at a portal server, comprising:
   receiving a first request from a client;
   in response to receiving the first request, authenticating the client;
   consulting a database to determine access privileges of the authenticated client for interactions with a plurality of applications, wherein the applications are located at backend servers;
   generating code containing selectable interactions with the applications, wherein any authentication for the selectable interactions is performed within the portal server sending the code to the client;
   responsive to sending the code to the client, receiving a second request from the client, wherein the second request contains a selection of at least one of the selectable interactions;
   determining from the selection a set of backend servers to process the second request;
   forwarding the second request to the set of backend servers;
   receiving results corresponding to the second request from applications executing on the backend servers; and
   sending the results to the client, wherein sending the results to the client further comprises:
   (i) generating further selectable interactions for at least two different applications selected from the applications located at the backend servers, wherein the backend servers are located outside the portal server; and
   (ii) sending the further selectable interactions with the results to the client, wherein the further selectable interactions for the at least two different applications located outside the portal server and the results are allowed to be displayed in a single Web page at the client.

2. The method of claim 1, wherein the portal server is a Web server and the portal server comprises a portal application.

3. The method of claim 1, wherein the database comprises a plurality of generic objects, wherein each generic object contains the access privileges related to a user for the elements of the plurality of applications.

4. The method of claim 3, wherein the access privileges indicate write access.

5. The method of claim 3, wherein the database is in the form of a table.

6. The method of claim 1 wherein the code is in a form that can be rendered into a Web page.

7. The method of claim 6, wherein the form of the code is comprised of active code, wherein the active code can be executed on the client.

8. The method of claim 1, wherein the selectable interactions correspond to operations within the applications and resources related to the applications, and wherein the applications, the operations within the applications, and the resources related to the applications are displayed on a single Web page.

9. The method of claim 1, wherein the selectable interactions correspond to resources related to the applications.

10. The method of claim 9, wherein the resources are selected from the group consisting of multimedia content, objects, files, attributes of objects, program elements, database objects, table entries.

11. The method of claim 1, wherein a selected backend application has a plurality of secure data objects having different security attributes, wherein each of the secure data objects corresponds to different interactions with the selected backend application, wherein
a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

12. A method at a backend system for securely making available a backend application, comprising:
   creating data structures corresponding to interactions with the backend application;
   associating privileges for each of the data structures, wherein the privileges are fully checked at a portal application separately hosted from the backend application;
   receiving, at the backend application, a request from the portal application for reading the data structures; and
   sending, from the backend application, the data structures to the portal application, wherein the interactions are operations that can be performed on the backend application and on resources related to the backend application, and wherein the backend application, the operations that can be performed on the backend application, and the resources related to the backend application are displayed on a single Web page on a client, wherein the portal application is included in a portal server, wherein the backend application is included in a backend server located outside the portal server, and wherein selectable interactions for at least two different backend applications located outside the portal server and results corresponding to at least one earlier operation are allowed to be displayed on the single Web page on the client.

13. The method of claim 12, further comprising:
   receiving a request for an interaction with the backend application from the portal application;
   processing the request without checking for the privileges; and
   sending the results of processing the request to the portal application.

14. The method of claim 12, wherein the data structures are data objects.

15. The method of claim 12, wherein a representation of the data structure is from the group consisting of a relational database, an XML document and a class.

16. The method of claim 12, wherein the interactions relate to resources associated with the backend application.

17. The method of claim 12, wherein a selected backend application has a plurality of secure data objects having different security attributes, wherein each of the secure data objects corresponds to different interactions with the selected backend application, wherein
a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

18. A method for accessing a group of applications at a client computer comprising:

authenticating with a portal server;

receiving a list of backend applications and interactions that can be performed with the backend applications from a portal application located in the portal server, wherein the backend applications are stored at backend servers that are different from the portal server;

selecting an interaction; and receiving results based on the selection of the interaction without authenticating with the backend servers, wherein receiving the results further comprises receiving a set of further interactions selectable by the client computer, wherein the portal server performs all necessary authentications of the client computer, and wherein the backend servers avoid any authentication of the client computer, wherein the backend applications are stored at the backend servers located outside the portal server, and wherein selectable interactions for at least two different backend applications located outside the portal server and results corresponding to at least one earlier operation are allowed to be displayed on a single Web page on the client computer.

19. The method of claim 18, wherein authenticating, receiving the list, selecting, and receiving results are at a Web browser.

20. The method of claim 18, wherein a selected backend application has a plurality of secure data objects having different security attributes, wherein each of the secure data objects corresponds to different interactions with the selected backend application, wherein
a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

21. A system for implementing security features, comprising:

a portal server;

means for receiving a first request from a client at the portal server;

means for authenticating the client, in response to receiving the first request;

means for consulting a database to determine access privileges of the authenticated client for interactions with a plurality of applications, wherein the applications are located at backend servers;

means for generating code containing selectable interactions with the applications, wherein any authentication for the selectable interactions is performed within the portal server;

means for sending the code to the client;

means for receiving a second request from the client in response to sending the code to the client, wherein the second request contains a selection of at least one of the selectable interactions;

means for determining from the selection a set of backend servers to process the second request;

means for forwarding the second request to the set of backend servers;

means for receiving results corresponding to the second request from applications executing on the backend servers; and means for sending the results to the client, wherein the means for sending the results to the client further performs:

(i) generating further selectable interactions for at least two different applications selected from the applications located at the backend servers, wherein the backend servers are located outside the portal server; and (ii) sending the further selectable interactions with the results to the client, wherein the further selectable interactions for the at least two different applications located outside the portal server and the results are allowed to be displayed in a single Web page at the client.

22. The system of claim 21, wherein the database comprises a plurality of generic objects, wherein each generic object contains the access privileges related to a user for the elements of the plurality of applications, wherein the database is in the form of a table, wherein the selectable interactions correspond to operations within the applications and resources related to the applications, and wherein the applications, the operations within the applications, and the resources related to the applications are displayed on a single Web page.

23. The system of claim 21, wherein a selected backend application has a plurality of secure data objects having different security attributes, wherein each of the secure data objects corresponds to different interactions with the selected backend application, wherein
a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

24. A system for securely making available a backend application, comprising:

a backend system hosting the backend application;

means for creating data structures at the backend system corresponding to interactions with the backend application;

means for associating privileges for each of the data structures, wherein the privileges are fully checked at a portal application separately hosted from the backend application;

means for receiving, at the backend application, a request from the portal application for reading the data structures; and means for sending, from the backend application, the data structures to the portal application;

means for receiving a request for an interaction with the backend application from the portal application;

means for processing the request without checking for the privileges; and means for sending the results of processing the request to the portal application, wherein the interaction is an operation that can be performed on the backend application and on resources related to the backend application, wherein the backend application, operations that can be performed on the backend application, and resources related to the backend application are displayed on a single Web page on a client, wherein the portal application is included in a portal server, wherein the backend server hosting the backend application is located outside the portal server, and wherein selectable interactions for at least two different backend applications located outside the portal server and results corresponding to at least one earlier operation are allowed to be displayed on the single Web page on the client.

25. The system of claim 24, wherein a selected backend application has a plurality of secure data objects having different security attributes, wherein each of the secure data objects corresponds to different interactions with the selected backend application, wherein a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

26. A system for accessing a group of applications comprising:
   a client computer;
   means for authenticating with a portal server from the client computer;
   means for receiving a list of backend applications and interactions that can be performed with the backend applications from a portal application located in the portal server, wherein the backend applications are stored at backend servers that are different from the portal server;
   means for selecting an interaction; and
   means for receiving results based on the selection of the interaction without authenticating with the backend servers, wherein the means for receiving the results further performs receiving a set of further interactions selectable by the client computer, wherein the portal server performs all necessary authentications of the client computer, and wherein the backend servers avoid any authentication of the client computer, wherein the backend applications are stored in the backend servers located outside the portal server, and wherein selectable interactions for at least two different backend applications located outside the portal server and results corresponding to at least one earlier operation are allowed to be displayed on a single Web page on the client computer.

27. The system of claim 26, wherein a selected backend application has a plurality of secure data objects having different security attributes, wherein each of the secure data objects corresponds to different interactions with the selected backend application, wherein
a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

28. A computer readable storage medium, including code for implementing security features at a portal server, wherein the code when executed by a processor causes operations, the operations comprising:
   receiving a first request from a client;
   in response to receiving the first request, authenticating the client;
   consulting a database to determine access privileges of the authenticated client for interactions with a plurality of applications, wherein the applications are located at backend servers;
   generating code containing selectable interactions with the applications, wherein any authentication for the selectable interactions is performed within the portal server;
   sending the code to the client;
   responsive to sending the code to the client, receiving a second request from the client, wherein the second request contains a selection of at least one of the selectable interactions;
   determining from the selection a set of backend servers to process the second request;
   forwarding the second request to the set of backend servers;
   receiving results corresponding to the second request from applications executing on the backend servers; and
   sending the results to the client, wherein sending the results to the client further comprises:
      (i) generating further selectable interactions for at least two different applications selected from the applications located at the backend servers, wherein the backend servers are located outside the portal server; and
      (ii) sending the further selectable interactions with the results to the client, wherein the further selectable interactions for the at least two different applications located outside the portal server and the results are allowed to be displayed in a single Web page at the client.

29. The computer readable storage medium of claim 28, wherein the portal server is a Web server and the portal server comprises a portal application.

30. The computer readable storage medium of claim 28, wherein the database comprises a plurality of generic objects, wherein each generic object contains the access privileges related to a user for the elements of the plurality of applications.

31. The computer readable storage medium of claim 30, wherein the access privileges indicate write access.

32. The computer readable storage medium of claim 30, wherein the database is in the form of a table.

33. The computer readable storage medium of claim 28, wherein the code is in a form that can be rendered into a Web page.

34. The computer readable storage medium of claim 33, wherein the form of the code is comprised of active code, wherein the active code can be executed on the client.

35. The computer readable storage medium of claim 28, wherein the selectable interactions correspond to operations within the applications and resources related to the applications, and wherein the applications, the operations within the applications, and the resources related to the applications are displayed on a single Web page.

36. The computer readable storage medium of claim 28, wherein the selectable interactions correspond to resources related to the applications.

37. The computer readable storage medium of claim 36, wherein the resources are selected from the group consisting of multimedia content, objects, files, attributes of objects, program elements, database objects, table entries.

38. The computer readable storage medium of claim 28, wherein a selected backend application has a plurality of secure data objects having different security attributes, wherein each of the secure data objects corresponds to different interactions with the selected backend application, wherein a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

39. A computer readable storage medium, including code for securely making available a backend application at a backend system, wherein the code when executed by a processor causes operations, the operations comprising:
   creating data structures corresponding to interactions with the backend application;
   associating privileges for each of the data structures, wherein the privileges are fully checked at a portal application separately hosted from the backend application;
   receiving, at the backend application, a request from the portal application for reading the data structures; and
   sending, from the backend application, the data structures to the portal application, wherein the interactions are operations that can be performed on the backend application and on resources related to the backend application, and wherein the backend application, the operations that can be performed on the backend application, and the resources related to the backend application are displayed on a single Web page on a client, wherein the portal application is included in a portal server, wherein the backend application is included in a backend server located outside the portal server, and wherein selectable interactions for at least two different backend applications located outside the portal server and results corresponding to at least one earlier operation are allowed to be displayed on the single Web page on the client.

40. The computer readable storage medium of claim 39, further comprising:
   receiving a request for an interaction with the backend application from the portal application;
   processing the request without checking for the privileges; and
   sending the results of processing the request to the portal application.

41. The computer readable storage medium of claim 39, wherein the data structures are data objects.

42. The computer readable storage medium of claim 39, wherein a representation of the data structure is from the group consisting of a relational database, an XML document and a class.

43. The computer readable storage medium of claim 39, wherein the interactions relate to resources associated with the backend application.

44. The computer readable storage medium of claim 39, wherein a selected backend application has a plurality of secure data objects having different security attributes, wherein each of the secure data objects corresponds to different interactions with the selected backend application, wherein a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

45. A computer readable storage medium, including code for accessing a group of applications at a client computer, wherein the code when executed by a processor causes operations, the operations comprising:
   authenticating with a portal server;
   receiving a list of backend applications and interactions that can be performed with the backend applications from a portal application located in the portal server, wherein the backend applications are stored at backend servers that are different from the portal server;
   selecting an interaction; and
   receiving results based on the selection of the interaction without authenticating with the backend servers, wherein receiving the results further comprises receiving a set of further interactions selectable by the client computer, wherein the portal server performs all necessary authentications of the client computer, and wherein the backend servers avoid any authentication of the client computer, wherein the backend applications are stored at the backend servers located outside the portal server, and wherein selectable interactions for at least two different backend applications located outside the portal server and results corresponding to at least one earlier operation are allowed to be displayed on a single Web page on the client computer.

46. The computer readable storage medium of claim 45, wherein authenticating, receiving the list, selecting, and receiving results are at a Web browser.

47. The computer readable storage medium of claim 44, wherein a selected backend application has a plurality of secure data objects having different security attributes, wherein each of the secure data objects corresponds to different interactions with the selected backend application, wherein a generic objects database is located in the portal server, wherein for each backend application the generic objects database includes a set of generic objects and associated security attributes for each potential user, wherein the set of generic objects correspond to the secure data objects, and wherein the generic objects stores at least those parts of the corresponding secure data objects that are needed for accessing and manipulating the secure data objects.

* * * * *